Oct. 19, 1954   G. F. LAMBERTH   2,691,908
TOOLHOLDER
Filed May 22, 1952
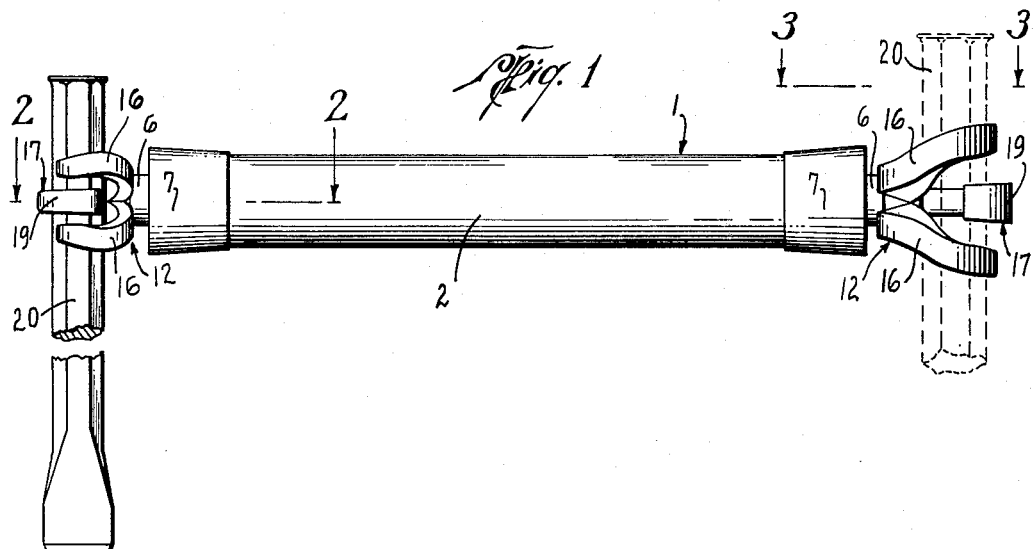
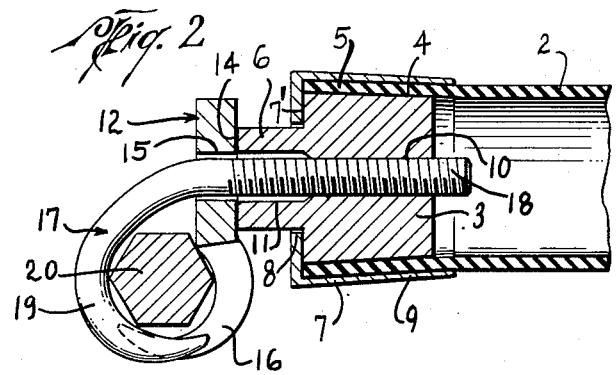
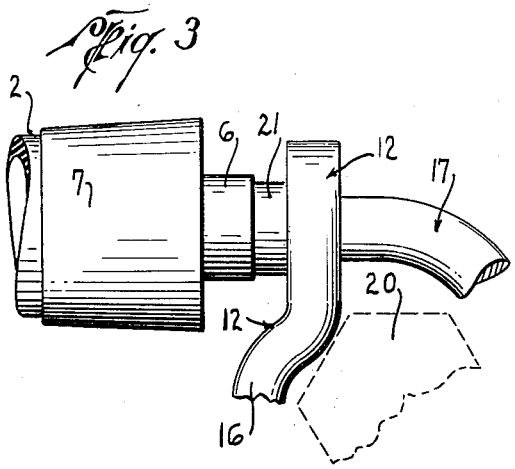
GEORGE F. LAMBERTH
INVENTOR.
BY Wm. E. Ford
ATTORNEY Patented Oct. 19, 1954

2,691,908

UNITED STATES PATENT OFFICE 2,691,908

TOOLHOLDER

George F. Lamberth, Houston, Tex., assignor of one-half to Claude Canion, Houston, Tex.

Application May 22, 1952, Serial No. 289,298

5 Claims. (Cl. 81—1)

This invention relates to a tool holder, as a chisel holder, which is adapted to dampen or absorb the impact of a blow imparted to such tool, while at the same time firmly holding the tool in engagement with the holder after the blow has been imparted.

It is an object of this invention to provide a tool holder, as a chisel holder, which can dampen or absorb the impact of a blow imparted to the tool thus held, while at the same time firmly maintaining engagement with the tool after the blow has been imparted.

It is a further object of this invention to provide a tool holder of this class which is adjustable to hold a variety of sizes of tools.

It is also an object of this invention to provide a tool holder of this class having a flexible handle to dampen and absorb the impact of a blow imparted to the tool held while at the same time maintaining a substantially rigid connection with the tool held.

It is yet a further object of this invention to provide a tool holder of this class which may be adapted to hold one size range of tools at one end of the handle and another size range of tools at the other end thereof.

Other and further objects will be apparent when the specification is considered in connection with the drawings in which:

Fig. 1 is an orthographic view of the tool.

Fig. 2 is a fragmentary sectional view of one end of the tool.

Fig. 3 is an enlarged fragmentary view of an end of the tool showing a modification thereof.

The tool holder 1 includes a flexible, tubular, handle portion 2 fabricated of some material as a fairly hard rubber. At each end of the handle portion there is an end member 3 insertable within the handle end. Such end member 3 may have a tapered outer surface 4 over which the handle end 5 may be extended. A head section 6 extends from the end member and a cap member or ferrule 7 has the bore 8 therein whereby the cap may be inserted over the head section 6 to rest upon the shoulder 7'. Then, when the side wall 9 of the cap is swedged inwardly, the handle end 5 is firmly secured between end member 3 and cap 7. The end member is axially threaded at 10 and the head section is bored at 11.

A clasp 12 is provided having a flat surface 14 to bear upon the head 6, and such clasp also has the bore 15 therethrough; and two spaced apart, curved talons 16 extend from the flat surface portion 14.

A second clasp 17 comprises the threaded shank 18 which has extending therefrom the talon 19. Thus, when the shank 18 is threaded into the end member at 10; the talon 19 which is oppositely curved from the talons 16 and which extends thereinbetween, may combine with such talons 16 to grasp a tool as a chisel 20, to firmly hold such tool against movement transversely or axially of the handle axis. Adjustment of the jaws or talons 16 and 19 toward and away from one another is effected by rotation of the handle bar 2 and thereby the nut 3, whose threaded engagement with the shank 18 results in relative axial travel of the nut and shank for clamping or releasing the tool 20 between the contractible talons.

Each end of the tool may have the same type of end member and cap installed thereon and one end can have larger clasps with larger radii of curvature to grasp tools of larger cross-sections. Also, as shown in Fig. 3, a washer 21 may be provided to space the clasp 12 for better adjustment.

It can thus be seen that the handle of the tool may be grasped at any point between the end members and held so that when a blow is imparted to the tool, as a chisel, the impact of the blow will not be fully imparted in vibratory effect upon the hand of the operator holding the handle. Rather, the resilient handle will dampen and absorb such vibratory effects. Thus a tool handle is provided which can hold the tool with assurance after a blow or force has been applied thereto while at the same time protecting the hand of the operator holding the handle from the undesirable vibratory effects which might otherwise be imparted were the holder of a metallic or rigid construction. Such a tool has especial adaptation for use as a chisel holder, as where the heads of rivets are to be severed.

This invention is not limited to the form disclosed but other types of clasps may be employed and other constructions may also be employed as handle end closures. Broadly this invention considers a tool handle providing a resilient, flexible handle and a means to rigidly and adjustably hold tools of various sizes at least at one end of the handle.

What is claimed is:

1. A tool holder comprising, a flexible handle portion, an axially threaded end member insertable in an end of said handle portion, a cap member insertable over said end member and swedged around said handle portion, a clasp member threaded at one end into said end member and having a single curved talon on the other end thereof, a second clasp member to bear at one end on said cap member and bored to a larger diameter than said first clasp to receive said first clasp therethrough, said second clasp member having a pair of talons on the other end thereof curved oppositely of said single talon, and spaced apart to receive said single talon thereinbetween whereby said talons may co-operate to tightly grasp an object, as a tool, to be held thereby when said first clasp is tightly threaded into said end member.

2. In a tool holder, a handle bar having a tubular nonmetallic, resilient end, an inner plug tightly seated within said end, an end clamping ferrule tightly seated in assembly retaining relation on said end, and a pair of tool holding jaws, one having an apertured head bearing on said plug and the other having a shank extending through said apertured head and into screw threaded engagement with said inner plug whereby handle rotation relative to said jaws controls their expansion and contraction.

3. A tool holder of the character described, a handle bar terminating in a tubular end whose wall is of non-metallic resilient material, an inner plug member tightly seated within said tubular end, an outer wall clamping ferrule member tightly sleeved on said tubular end and co-operating with the plug member to firmly secure said wall therebetween, and a set of co-operating tool clasping claws including a first claw in solid abutment with one of said members and a second claw adjustably connected to one of the members for adjustment toward and away the first claw.

4. In a tool holder, a pair of relatively adjustable clasps, mounting means therefor including a plug fixedly positioning one and adjustably supporting the other of said clasps, a handle bar having a hollow, nonmetallic, resilient end sleeved on the plug, and a retaining ferrule embracing said hollow end, said plug and ferrule co-operating with one another to hold the end therebetween.

5. A tool holder wherein a pair of relatively adjustable clasps grip a tool therebetween, means for adjustably supporting said clasps including a handle having a tubular end of nonmetallic, resilient material, a tapered plug snugly seated interiorly of said end, and a ferrule sleeved on said tubular end and tapered in mating relation with the plug, the tapered surfaces of plug and ferrule being annularly spaced apart a distance to receive the wall of said tubular end and confine the same against separation from said plug and ferrule.

References Cited in the file of this patent

UNITED STATES PATENTS

| Number | Name | Date |
|---|---|---|
| 2,589,075 | Gravis | Mar. 11, 1952 |